June 20, 1944.  A. L. PARKER  2,351,873
RELIEF VALVE
Filed March 31, 1941

Inventor:
ARTHUR L. PARKER
By Mason & Porter
Attorneys

Patented June 20, 1944

2,351,873

UNITED STATES PATENT OFFICE 2,351,873

RELIEF VALVE

Arthur L. Parker, Cleveland, Ohio, assignor to The Parker Appliance Company, Cleveland, Ohio, a corporation of Ohio Application March 31, 1941, Serial No. 386,221

1 Claim. (Cl. 137—53)

The invention relates to new and useful improvements in a relief valve for fluid pressure lines and the control mechanism associated therewith.

An object of the invention is to provide a relief valve which is so constructed that back pressure on the exhaust side of the valve will not cause fluid to leak through the valve into the pressure line.

A further object of the invention is to provide an auxiliary valve control which is associated with the relief valve and is so constructed that said auxiliary control valve may be placed at a point distant from the relief valve and thereby associated with the control panel for the fluid pressure system.

Figure 1:
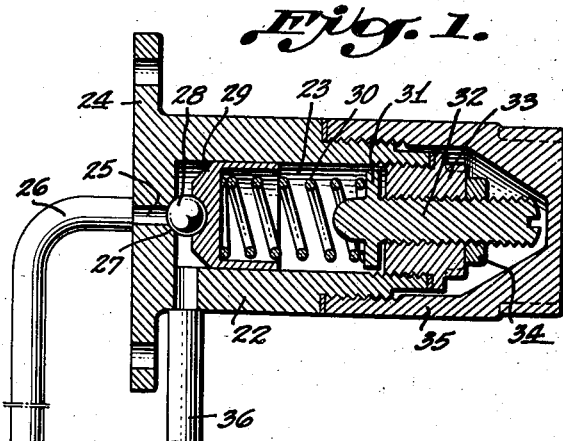
Figure 1 is a sectional view through the relief valve lengthwise thereof, and also through an automatically operated control valve associated with the relief valve.

The relief valve includes a valve casing 1 having a pipe thread connection 2 to which a pipe may be joined that leads to the pressure lines. Said casing is also provided with a pipe thread connection 3 to which a pipe may be joined that leads to the exhaust side of the pressure line. The pipe connection 2 is threaded into the valve casing and carries a valve seat 4 with which a valve 5 cooperates. The valve 5 is carried by a valve stem 6.

A sleeve member 7 is threaded into the upper end of the valve stem. Said sleeve is provided with a head which contacts with a gasket 8. Below the gasket 8 is a metal ring 9, and below the metal ring 9 is a gasket 10. The gasket 8 is so constructed as to prevent leakage of the pressure fluid in the chamber 11. The gasket 10 is so constructed as to prevent leakage due to back pressure on the exhaust side.

The valve is provided with a tapered end 12 which engages the valve seat 4. There is a relatively restricted passage 13 leading through the lower end of the valve into a passage 14 which is connected with the chamber 11. A spring 15 bears against the shoulder at the lower end of the sleeve 7 and normally urges the valve against the seat 4.

Figure 3:
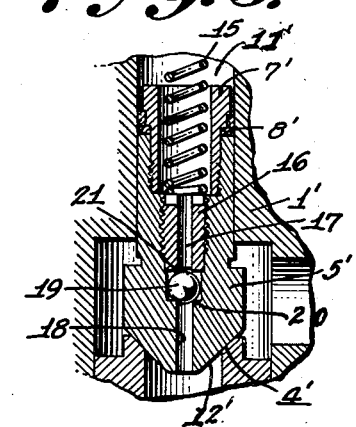
Figure 3 is a sectional view longitudinally of the valve casing showing a slightly modified form of relief valve structure.

As shown in Figure 3, the valve casing 1' and the valve seat 4' are of the same construction as shown in the relief valve of Figure 1. Likewise, the sleeve 7' and the spring 15' are associated with the valve for holding it seated. In this form of valve structure there is a sleeve insert 16 having a passage 17 therethrough. The opening leading from the lower end of the valve indicated at 18 is of considerably larger size than opening 13. At the upper end of this opening 18 there is a valve chamber for a ball valve 19. At the lower side of this ball is a valve seat 20. The lower end of the sleeve insert has one or more V-shaped grooves 21. This ball is of slightly smaller diameter than the diameter of the chamber in which it is located so that fluid pressure on the system will pass up through opening 18 around the ball when the ball is lifted from its seat and through the sleeve insert into the chamber 11 at the upper end of the valve casing.

The auxiliary control valve as shown in Fig. 1 includes a casing 22 having a chamber 23 therein. The casing is provided with a base member 24 which may be secured to a control panel by any suitable means. There is an opening 25 through the base leading into chamber 23. A pipe 26 is connected to the base at the opening 25. This pipe may be of any desired length and at its other end it is connected to an opening 26a through the wall of the valve casing 1.

Surrounding the opening 25 is a valve seat 27 with which a ball valve 28 makes contact. A plate 29 bears against the ball and is provided with a flange contacting with the wall of the chamber 23 for guiding the same. A spring 30 bears on the plate 29 at one end and at its other end against an abutment shoulder 31 carried by a stem 32 which is threaded into a cap nut 33. The cap nut 33 is in turn threaded into the valve casing 22. Mounted on the stem 32 is a locknut 34. A closure cap 35 covers this stem 32 and is detachably connected to the valve casing.

When it is desired to change the tension on the spring 30, the cap is removed and the stem 32 adjusted for this purpose.

As above noted, this auxiliary control valve may be placed at a point distant from the relief valve and is connected therewith through the pipe 26. The exposed area 12 of the valve is slightly less than the exposed area of the sleeve 7. Fluid pressure on the line causes fluid to pass through the opening 13 into the chamber 11 at the upper end of the relief valve casing. This fluid pressure passes through the pipe 26 to the auxiliary control valve in the casing 22. When the pressure is insufficient to raise the ball 28 off its seat against the spring 30 and the pressure of the fluid on the upper side of the sleeve 7, the relief valve will remain closed. When the fluid pressure on the line rises above a predetermined setting of the tension on the spring 30, then the ball 28 will be forced off its seat and fluid will pass into the chamber of the auxiliary valve and out through the pipe 36 to the exhaust side of the fluid pressure system. This reduces the pressure in the chamber 11 so that the pressure on the underside 12 of the relief valve will lift it from its seat. The fluid passing to the exhaust side of the system through the pipe connection 3 will relieve the pressure on the line. This relief of the pressure on the line will not cause the valve to close quickly and chatter for the reason that the passage 13 is relatively small and the pressure in the chamber 11 will not build up so as to permit the spring to close the valve 5 until the ball valve 28 of the auxiliary control closes.

In the construction shown in Figure 3 the relief valve will operate in the manner above described to relieve the pressure on the line. The opening 18 is larger than the opening 13 but there is a restricted passage around the ball and also a restricted passage through the V-groove 21 when the ball is lifted by pressure against the lower end of the sleeve insert 16. Any back pressure on the exhaust line which causes fluid to pass the gasket 8' into the chamber 11' will act through the passage 17 against the ball and cause the ball 19 to engage the seat at the lower side thereof and thus the fluid is prevented from bypassing through the valve into the pressure line. The auxiliary control valve shown in Figure 1 will be associated with this relief valve as illustrated in Figure 3.

Figure 2:
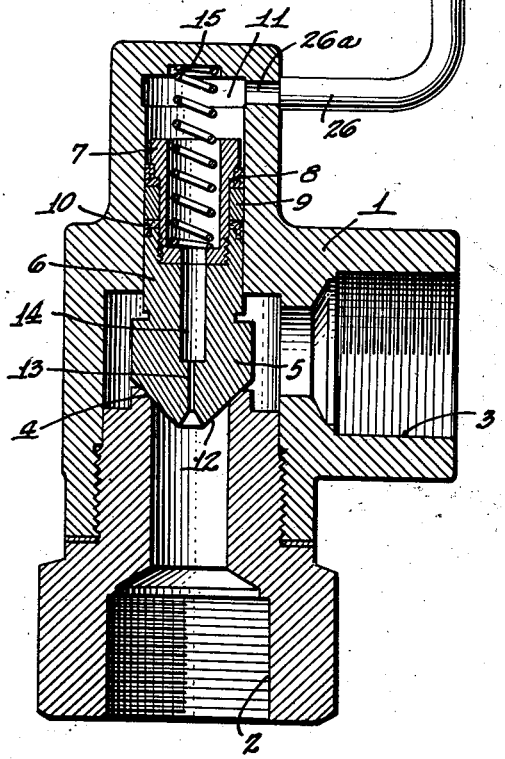
Figure 2 is a view in side elevation and showing more or less diagrammatically a manually operated auxiliary control valve associated with the relief valve.
Figure 2:
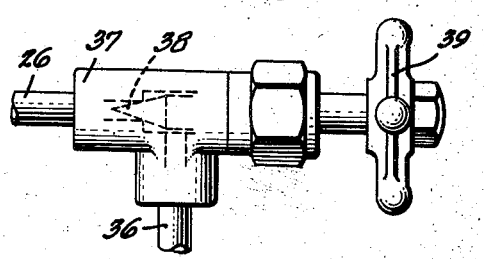
Figure 5:
Figure 5 is an end view of the valve insert.
Figure 4:
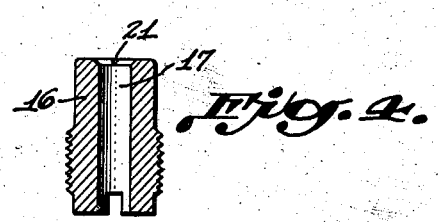
Figure 4 is a detailed section of the sleeve insert associated with the ball valve in Figure 3.

In Fig. 1 the auxiliary control valve as described above is automatically controlled. In Fig. 2 there is a manually operated auxiliary control valve. This control valve includes a casing 37 to which the pipe 26 is connected and to which the exhaust pipe 36 is also connected. In this valve casing is a needle valve 38 cooperating with a seat for closing off connection with the pipe 26. The needle valve is controlled by a hand wheel 39. This manually operated auxiliary control valve may be located at the control panel and at a point distant from the relief valve. This needle valve is normally closed. When pressure on the line rises above a selected working pressure and it is desired to reduce the same, then the needle valve is opened and this will cause the relief valve to open and reduce the pressure. It is to be understood that the relief valve of Figure 3 can be used in connection with either of the auxiliary control valves shown in Figures 1 and 2.

I claim:

In a fluid pressure system, a relief valve including a valve casing having an inlet for connection to a fluid pressure line, a valve seat in said casing, said valve casing having a port for exhaust above the valve seat, a valve mounted for reciprocation in the valve casing and adapted to engage said seat, said valve casing having a chamber above the valve, a passage extending through the valve and connecting the inlet with the chamber above the valve, the area of the upper end of the valve subjected to pressure being slightly greater than the area of the lower end of the valve subjected to fluid pressure when the valve is closed, means for exhausting the pressure fluid from the chamber above the valve, said passage in the valve being enlarged at the upper portion of the valve and having a ball seat at the bottom of said enlargement, a ball dimensioned to have restricted freedom to move in said enlarged passage so as to provide for restricted passage thereabout in the enlarged passage and adapted to engage the ball seat for closing the passage when the pressure is applied to the ball from above, a plug in said valve above said ball, said plug being spaced from the ball and having a central opening therethrough with a V-notch in the edge contacted by the ball providing a restricted passage past the ball when it is raised into engagement with the plug.

ARTHUR L. PARKER.